United States Patent
Lopresti et al.

[11] Patent Number: 5,793,903
[45] Date of Patent: Aug. 11, 1998

[54] MULTIMEDIA RENDERING MARKER AND METHOD

[75] Inventors: Daniel P. Lopresti, Hopewell, N.J.; Jonathan S. Sandberg, New York, N.Y.

[73] Assignee: Panasonic Technologies, Inc., Princeton, N.J.

[21] Appl. No.: 434,560

[22] Filed: May 3, 1995

Related U.S. Application Data

[63] Continuation of Ser. No. 137,617, Oct. 15, 1993, abandoned.
[51] Int. Cl.⁶ .................................................. G06K 9/00
[52] U.S. Cl. .................................... 382/309; 382/306
[58] Field of Search .................................... 382/232, 233, 382/305, 306, 309, 310, 312; 395/153, 154; 348/388, 389, 601

[56] References Cited

U.S. PATENT DOCUMENTS

| | | | |
|---|---|---|---|
| 4,021,777 | 5/1977 | Shepard | 382/61 |
| 4,157,783 | 6/1979 | Muster et al. | 382/61 |
| 4,736,447 | 4/1988 | Korinsky | 382/69 |
| 5,241,671 | 8/1993 | Reed et al. | 395/600 |
| 5,247,591 | 9/1993 | Baran | 382/61 |
| 5,251,273 | 10/1993 | Betts et al. | 382/61 |

*Primary Examiner*—Yon J. Couso
*Attorney, Agent, or Firm*—Amster, Rothstein & Ebenstein

[57] ABSTRACT

A marker encoded and provided in the side channel of an analog rendering provides digital information about the analog rendering with which it is simultaneously provided. Perceptible non-intrusive, computer-interpretable encodings, incorporated into printed, handwritten, pictorial or video communication renderings, and audible, non-intrusive, computer-perceptible encodings in audio renderings, using available side channel bandwidth in those media, allow generating or preprocessing computer-to-recognizing computer communication of a wide range of information relating to the generation and reproduction of the main channel analog information, such as error correction encoding, scan order encoding, object identification and algorithms used in generating the analog information.

27 Claims, 6 Drawing Sheets

F I G. 1

| APPLICATION AREAS | MEDIA DIMENSION | ACCURACY | SCANNER |
|---|---|---|---|
| SPEECH R R | 1 (time) | 95 | MICROPHONE |
| CHARACTER R R | 2 (x,y) | 99 | OPTICAL SCANNER |
| HANDWRITING R R | 3 (x,y,time) | 80 | DIGITIZING PAD |
| IMAGE R R | 3 (x,y,z) | NA | DIGITIZING SCANNER |
| MOVING IMAGE R R | 4 (x,y,z,time) | 97 | DIGITIZING CAMERA |

FIG. 3A

|   | A | B | C | D | E | F |
|---|---|---|---|---|---|---|
| 1 | MONTH | Q1 | Q2 | Q3 | Q4 | TOTAL |
| 2 | SEASONALLY | 0.9 | 1.1 | 0.8 | 1.2 | |
| 3 | | | | | | |
| 4 | UNITS SOLD | 3,592 | 4,390 | 3,192 | 4,789 | 158,962 |
| 5 | SALES REVERSE | 143,662 | 175,587 | 127,700 | 191,549 | 638,498 |
| 6 | COST OF SALES | 89,789 | 109,742 | 79,812 | 119,718 | 398,061 |
| 7 | GROSS MARGIN | 53,879 | 65,845 | 47,831 | 71,831 | 239,437 |
| 8 | | | | | | |
| 9 | SALESFORCE | 8,000 | 8,000 | 9,000 | 9,000 | 34,000 |
| 10 | ADVERTISING | 10,000 | 10,000 | 10,000 | 10,000 | 40,000 |
| 11 | CORP OVERHEAD | 21,549 | 26,338 | 19,155 | 28,732 | 95,775 |
| 12 | TOTAL COSTS | 39,549 | 44,338 | 38,155 | 47,732 | 169,775 |
| 13 | | | | | | |
| 14 | PROD. PROFIT | 14,324 | 21,507 | 9,732 | 24,099 | 69,662 |
| 15 | PROFIT MARGIN | 10 | 12 | 8 | 13 | 11 |

FIG. 3B

|   | A | B | C |
|---|---|---|---|
| 1 | MONTH | Q1 | Q2 |
| 2 | SEASONALITY | 0.9 | 1.1 |
| 3 |   |   |   |
| 4 | UNITS SOLD | =35*B2*(B10+3000)ˆ.5 | =35*C2*(C10+3000)ˆ.5 |
| 5 | SALES REVERSE | B4*$B$17 | C4*$B$17 |
| 6 | COST OF SALES | B4*$B$18 | C4*$B$18 |
| 7 | GROSS MARGIN | B5-B6 | C5-C6 |
| 8 |   |   |   |
| 9 | SALESFORCE | 8000 | 8000 |
| 10 | ADVERTISING | =10000 | =10000 |
| 11 | CORP. OVERHEAD | 0.15*B5 | 0.15*C5 |
| 12 | TOTAL COSTS | =SUM(B9:B11) | =SUM(C9:C11) |
| 13 |   |   |   |
| 14 | PROD. PROFIT | =B7-B12 | =C7-C12 |
| 15 | PROFIT MARGIN | =B14/B5 | =C14/C5 |

FIG. 3B-1

| | D | E | F |
|---|---|---|---|
| | Q3 | Q4 | TOTAL |
| | 0.8 | 1.2 | |
| | =35*D2*(D10+3000)8.5 | =35*B2*(B10+3000)8.5 | =SUM(B4:B4) |
| | D4*$B$17 | B4*$B$17 | =SUM(B5:B5) |
| | D4*$B$18 | B4*$B$18 | =SUM(B6:B6) |
| | D5-D6 | B5-B6 | =SUM(B7:B7) |
| | | | |
| | 9000 | 9000 | =SUM(B9:B9) |
| | =10000 | =10000 | =SUM(B10:B10) |
| | 0.15*D5 | 0.15*B5 | =SUM(B11:B11) |
| | =SUM(D9:D11) | =SUM(B0:B11) | =SUM(B12:B12) |
| | | | |
| | =D7-D12 | =B7-B12 | =SUM(B14:B14) |
| | =D14/D5 | =B14/B5 | =F14/F5 |

FIG.4

MULTIMEDIA RENDERING MARKER AND METHOD

This is a continuation of application Ser. No. 08/137,617 filed on Oct. 15, 1993 now abandoned.

The invention relates primarily to the provision, along with perceptible analog information, of perceptible, digital, computer-recognizable information for use by a "recognizing computer" in recovering or otherwise processing the analog information provided therewith. More specifically, simultaneous provision of digital information in a perceptible, but non-intrusive, "side channel", along with the analog "main channel" content information, will facilitate computer interpretation, recovery, and use of the analog content information.

BACKGROUND OF THE INVENTION

Provision of enhancement information with analog information is a familiar means by which the communicated analog information can be more readily received. The enhancement information may take the form of a Braille "translation" of printed text, closed captioning of television programming for hearing impaired viewers, or subtitles or dubbed audio translations of foreign language dialogue in films, to cite a few examples. In the foregoing examples, all of the contents of the particular analog information to which the enhancement information corresponds are received via the same media as the analog information, in a form which is perceptible to the targeted user. Other methods of providing additional information for enhancement, identification or interpretation of analog information include bar coding for identification and/or pricing of items, glyph encoding with computer-resident documents for document identification and retrieval (e.g., the Xerox technology taught in U.S. Pat. No. 5,060,980 of Johnson, et al), and VCR enhancement systems for automatic video cassette recorder cuing. The latter examples provide a limited amount of data about the analog information, which data does not correspond in full to the analog information.

In the first group of prior art systems, the information is provided for targeted human perception, whereas the latter group of systems provide information for targeted machine use. A class of machines for which coded identification and interpretation information would be particularly well suited is the class of computer recognition systems. Computer recognition systems have been developed for the recognition and reproduction of analog information or signals generated in a wide variety of media. For example, systems have been developed for the recognition of handwritten information, pictorial data, speech and non-speech audio and video embodiments of analog information, and printed matter, hereinafter generically referred to as "signals".

In the realm of printed material, optical character recognition systems have advanced to a fairly sophisticated level of efficiency and accuracy. However, accuracy of less than 100% is generally unacceptable, since the cost of human "post-processing" of the reproduced data negates the savings realized by the computer involvement. Notwithstanding the advances in the computer recognition and reproduction arena, means by which to enhance the identification, recognition, interpretation and reproduction of analog information are needed to bring the technology to a level of accuracy which is realistic for widespread acceptance and use.

It has been proposed that encoded data-dependent document markers be incorporated onto printed documents for assisting an optical character recognition system in the recognition and reproduction of the analog print information and layout detail found thereon, as detailed in a co-pending patent application (continuation-in-part application Ser. No. 08/138,467, filed Oct. 15, 1993, entitled "A METHOD AND MEANS FOR ENHANCING OPTICAL CHARACTER RECOGNITION OF PRINTED DOCUMENTS") and in U.S. Pat. No. 5,625,721 ("CERTIFIABLE OPTICAL CHARACTER RECOGNITION"), both assigned to the present assignee. The teachings of the aforementioned patent application and Patent are herein incorporated by reference. In the referenced patent application and Patent, a method is provided for conveying a first quantified value, or plurality of values, along with the printed analog information, provided by a computer which is adapted to generate the data-dependent value or values upon generation or preprocessing of the printed analog information. The relevant computer recognition system is similarly adapted to generate a data-dependent value, or values, for the analog data reproduced in the recognition process, and further adapted to compare the later-generated value or values with the first values or values in order to ascertain the existence, location, and nature of layout, substitution, deletion and insertion errors in the reproduced version of the analog information. In addition to error location, error correction is realized by the document marker encoding system of the pending applications.

What would additionally be desirable is a marker encoding system for providing not only error correction and layout information about the contents of an analog signal, but also information about the generation of the analog signal (e.g., identification of the computer program used in generating a document). Further, the marker encoding concept would ideally be extended to include perceptible information for use in the computer recognition and reproduction of analog signal content information generated in a variety of media (e.g., print, audio, video, handwriting or picture signals). Unlike the glyph technology, wherein the receiving computer necessarily has a resident digital version of the analog data and is merely using the glyph to hasten access thereto, the extension of the certificate concept will ideally invest the analog signal with all information necessary for accurate reproduction by a recognizing system's computer.

It is therefore an objective of the present invention to provide side channel information for use by a computer recognition system in accurately recognizing and reproducing simultaneously transmitted analog signals.

It is a further objective of the present invention to encode information about the contents of an analog signal and provide the encoded information in the same media as the analog information in a perceptible yet unobtrusive manner, the analog content and the encoded information together comprising the "signal plus marker".

It is yet another objective of the present invention that the encoded information, although perceptible to a human user of the analog information, be provided for perception, interpretation and use by the recognizing computer.

Another objective of the invention is to provide a means and method for correcting errors introduced when conducting computer recognition and reproduction of an analog signal.

Yet another objective is to improve the range of objects recognized during computer recognition and reproduction of the analog signal.

SUMMARY OF THE INVENTION

These and other objectives are realized by the present invention wherein a first computer, which is generating a signal comprised of a stream of digitally processed analog main channel information, encodes side channel information about the generation and content of the main channel information and transmits the side channel information in the same perceptible medium simultaneously with the transmission of the main channel analog information, the analog information and encoding together comprising the "signal plus marker". Perceptible, non-intrusive, computer-interpretable encodings or markers, provided with the printed, handwritten, pictorial or video signals, and audible, non-intrusive, computer-perceptible encodings with audio signals, using available "side channel" bandwidth in those media, allow generating computer-to-recognizing computer communication of a wide range of information related to the generation and reproduction of the main channel analog information. In addition, a preprocessing computer, which has not specifically generated the original analog signal, can scan and digitize the analog signal, encode a marker therefore and incorporate the inventive encoding for the signal to facilitate the accurate recognition of that analog signal by a recognizing computer.

BRIEF DESCRIPTION OF THE PREFERRED EMBODIMENTS

The invention will be further detailed with specific reference to the attached drawings wherein.

DETAILED DESCRIPTION OF THE PREFERRED EMBODIMENTS

Where the physical media allows for the establishment of a reliable side channel, the present invention utilizes such side channel to provide a "marker" of perceptible, machine-usable information simultaneously with the transmission of the main content information to which it pertains. In addition to the existence of the side channel, a basic requirement for implementation of the invention is the existence of a symbology for the expressive and reliable encoding of side channel information. Although referred to as a "side channel", the portion of the medium which carries the marker is not apart or different from the main content channel; rather, it is an otherwise unused portion of the available bandwidth of the signal's medium. The information provided in the side channel marker can expand the number and types of objects recognized (including, but not limited to, spatial, temporal and graphical information embedded in a digital representation of the signal), can provide error correction, and can provide semantic information about the signal which would not otherwise be available to the scanning computer. Throughout the description and claims, the term "signal" will be used to designate any main channel information to be recognized, regardless of the rendering's medium, and will therefor encompass all visible or audible information.

Limits on the amount of data that can be appended to a signal are dependent on the technical capabilities of the digitizing scanner with respect to the physical media, the computational time costs, and the available free media bandwidth. For the enhanced recognition of speech or non-speech audio, a sequence of audible tones acts as markers in the side channel. In optical character recognition (OCR), a portion of the page is used for perceptible markers, which need not be perceptible to the human user, as discussed in the previously mentioned co-pending patent applications. For still and moving images, a portion of the image frame acts as the side channel for enhancement markers.

Figure 1:
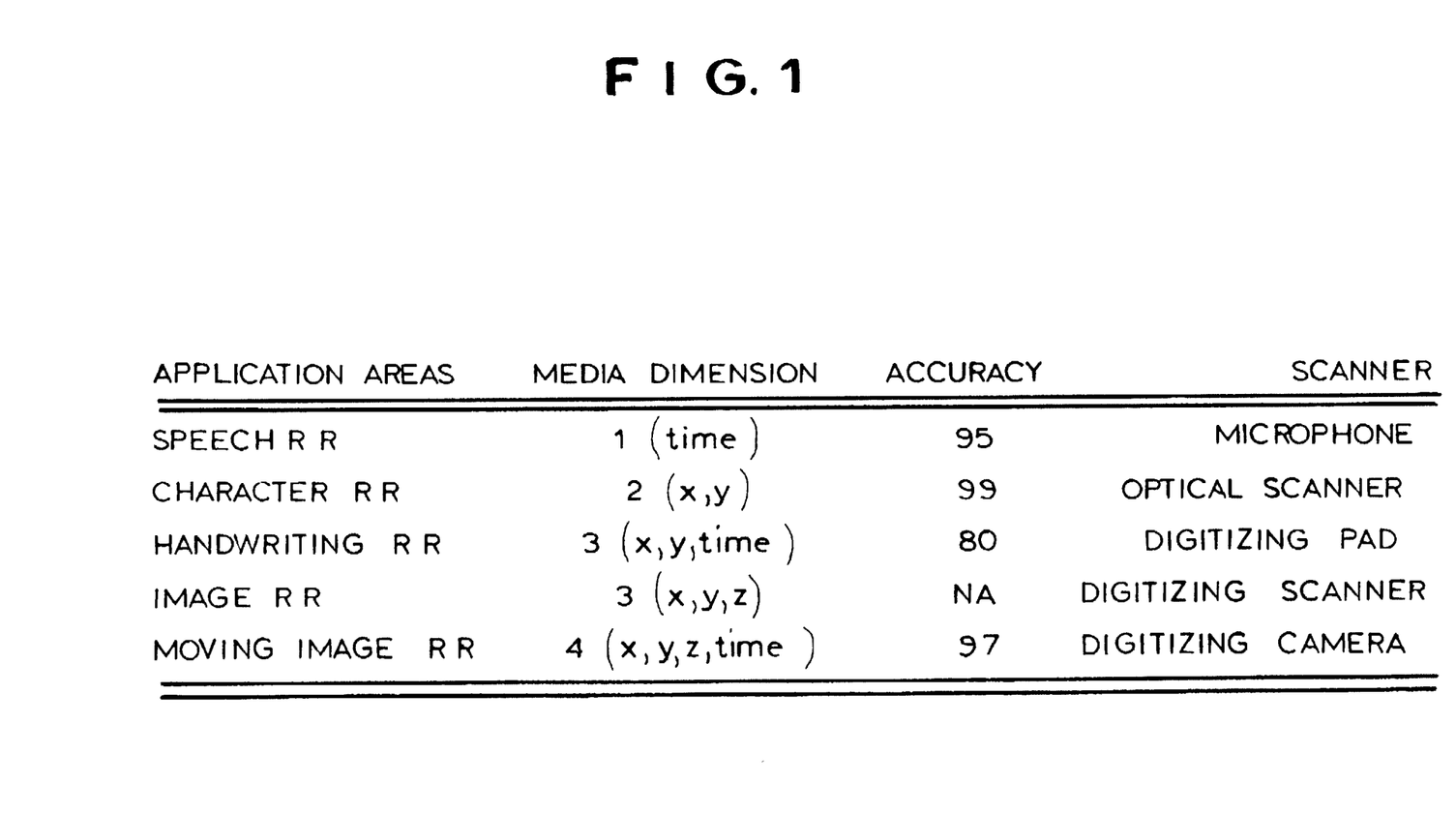
FIG. 1 provides a table showing the various media to which the present invention can be applied and the presently available degree of recognition and recovery accuracy for those media.

Representatives of the standard media to which the present invention can be applied are outlined in FIG. 1. As illustrated therein, for each medium, the dimensions, available recognition and recovery accuracy under the current technology, and an example of a relevant digitizing scanner for the medium, are detailed. As will be apparent to one having skill in the art, in order to develop encoding fluctions, a sequence of encoding of the objects to be recognized in the signal must be established. For a one-dimensional signal, such as speech, one object (i.e., word or other utterance) follows the another in time and the "scan order" is innately predetermined thereby. Similarly, for typical printed documents, the standard scan order of left-to-right, top-to-bottom for English-language texts (or such other order as is understood for any other language) is generally applied automatically by the recognizing computer. However, if the printed document includes graphics or other non-typical layout characteristics, the scanning computer must be "told" how to decompose the space for effective recognition of the contents thereof. Furthermore, for multidimensional signals such as dubbed moving images, the sequencing of objects to be recognized is further complicated by the fact that there may be multiple image dimensions (e.g., time, frame, location within frame, color, etc.) as well as multiple sound dimensions (e.g., multiple speakers, sound tracks, etc.). The markers of the present invention will, therefore, incorporate not only the error correction and generation information referred to above, but also the scan order for decomposition of the reference space. Some markers may, moreover, be simultaneously emitted over several independent media (e.g., sound and moving images) for the same signal.

The following model establishes that if a digital scanning process can recover a scanned signal which is close to the original signal, simple error correction techniques can eliminate remaining errors, while further semantic information encoded in the marker can provide additional certainty. Assuming a discretized reference space S (ie. $Z \times Z$, $Z_n \times Z_n$, $Z \times Z \times Z$, etc.) where the sets $B_i$, $C_i$, $D_i$, $\subset S$. Indexed subsets of S contained between curly braces $\{B_i\}=\{B_1 \ B_2 \ldots B_N\}$ represent sequences of subsets over S. In general, matching curly braces will denote a sequence of elements.

The definition of the reference space is abstract because there are many different media on which to generate digital data. The most obvious media is text on the printed page, in which case the reference space is $Z_n \times Z_m$. Other important reference spaces might be the following: one dimensional space Z representing (single speaker) spoken English within the threshold of hearing, or three dimensional space $Z_m \times Z_n \times Z_p$ representing full motion video projected to a screen. Notice that the reference space can be finite, as in the case of generating the primary analog information on a single printed page, or infinite, as in the case of generating the information within the threshold of hearing.

The alphabet represents the individual elements or objects which are to be recognized in the signal. The alphabet is referred to as $\Sigma$ where $\alpha_i$, $\beta_i$, $\gamma_i$, $\epsilon_i \in \Sigma$. Let $\Sigma^*$ represent the set of sequences over $\Sigma$. Depending on the reference space, the nature of the alphabet may be quite different. If the reference space corresponds to a two-dimensional piece of paper, then the alphabet simply corresponds to that used in the native language. If the reference space corresponds to a stream of spoken English, the alphabet may correspond to individual phonemes.

The encoding function is defined as that which maps elements of the alphabet, or objects with images to be recognized, to the non-negative integers. Second, generating a signal involves assigning alphabet elements to subsets of the reference space, thereby representing the placement and layout of alphabet element images in the reference space. Third, the digital scan function, D, models the process of digitizing an existing signal. The digital scan conversion between a signal's analog image and digital image is the point at which error is introduced. Fourth, the metric function, d, establishes a notion of distance that will be used to precisely define when two signals are "close". Finally, the certification function, F, describes the side channel data computed during preprocessing and used for data recovery.

The encoding function that allows preprocessing computation is defined as: $\epsilon: \Sigma \rightarrow Z$. The encoding function can be as simple as the index of the alphabet sequences of the signal. Other choices of encoding functions, such as ASCII, Japanese Industrial Standard (JIS), or Huffman codes, for example, may be specially selected depending on the structure of the alphabet sequences used in the signal. For example, some encodings may allow more reliable recovery of Kanji text than English text, or vice versa. Still other object encodings may be appropriate in the representation of speech or images. Specific encoding functions may also be selected to match certification functions to provide better fault tolerance or faster data recovery.

A function is needed which describes how images of digitally represented objects can be oriented and placed on the media modeled by the reference space. The orientation, placement, and delivery of these images along the medium is called the signal. Thus text may be generated on a page, words may be generated acoustically, or mobile objects may be generated visually on a television screen. As defined, therefore, a signal is an assignment of elements of the alphabet $\Sigma$ to elements of a sequence of subsets S, each $B_i \subset S$ in the sequence of subsets, $\{B_1, B_2 \ldots B_N\}$ is assigned an element $\alpha_i$, where $\alpha_i, \epsilon\Sigma$.

The individual subsets $B_i \subset S$ decompose the reference space in such a way that there is one element of the alphabet assigned to each subset where R(S) is the set of signals in S. Such an abstract decomposition allows modeling of: intersecting or overlapping alphabet elements, variable resolution rendering interpretation, and multilevel object interpretation. The subsets need not be of any uniform size or shape and they may or may not cover the entire reference space. In addition to the reference space decomposition, one can establish an index over the subsets $B_i$ to define an induced sequence over $\Sigma$. Careful analysis of the induced sequence (or of the space of induced sequences, i.e., the language) can increase the capabilities and performance of the data transmission process, specifically with respect to the certification function selection.

The operation of concatenation of sequences is denoted by listing consecutive elements in a set such as $seq_1$ $seq_2$ $seq_3 \ldots$ or $\alpha\beta \ldots \gamma$. Elements in the space are then defined as a signal $R_i$, $seq_i \epsilon R(S)$. Therefore, signals $R_0$, $R_1$ and $R_2$ are:

$R_0 = \{(B_1, \alpha_1)(B_2, \alpha_2) \ldots (B_N, \alpha_N)\}$, $R_1 = \{(C_1, \beta_1)(C_2, \beta_2) \ldots (C_{N+m1}, \beta_{N+m1})\}, m_1 \epsilon Z$, and $R_2 = \{(D_1, \gamma_1)(D_2, \gamma_2) \ldots (D_{N+m2}, \gamma_{N+m2})\}, m_2 \epsilon Z$.

Any signal, say $R_0$, induces a sequence over the alphabet $\Sigma$. In the case of $R_0$, the induced sequence is $\alpha_1 \alpha_2 \ldots \alpha_n \epsilon\Sigma$. For a given subset of R(S) the corresponding set of included sequences in $\Sigma^*$ is called the Language of the subset. For example, for the set of elements used in this signal (i.e., this document), the language of the subset is the subset of the English language.

The digital scan function provides a model for the introduction of error, as observed in the real digital scanning process. The interpretation function, which models element by element interpretation performed by the digital scanning process is defined such that $I:R(S) \times R(S) \rightarrow R(S)$ maps the Cartesian product of the space of signals over S with itself to R(S).

$$I(R_x, R_y) = \begin{cases} \text{NULL} & \text{If } R_x \text{ is not a subsequence of } R_y \text{ of length 1} \\ seq \in R(S) & \text{otherwise} \end{cases}$$

The digital scan function is defined as the application of the interpretation function for each of the subsets $B_i$ of the signal using index order, whereby $D:R(S) \rightarrow R(S)$ maps objects over the reference space S to itself. Letting $j_1, j_2, \ldots, j_N$ be any permutation of the sequence 1, 2, ..., N.

$$D(R_0) = I(\{(B_{j1}, \alpha_{j1})\}, R_0)I(\{(B_{j2}, \alpha_{j2})\}, R_0)I(\{(B_{j3}, \alpha_{j3})\}, R_0) \ldots$$

Thus, if $D(R_0) = R_1$ then $R_1 = seq_{j1} seq_{j2} seq_{j3} \ldots$ where $seq_i = I((B_i, \alpha_i), R_0)$ such that $seq_{j1} seq_{j2} seq_3 \ldots = \{(C_1, \beta_1)(C_2, \beta_2) \ldots, (C_{N+m1}, \beta_{N+m1})\}, m_1 \epsilon Z$ Such a "digital scan" of the analog signal $R_0$ clearly allows addition, deletion, substitution and transposition (among other operations) to produce the digitized signal $R_1$. Obviously, a digital scan can produce a new signal that is quite unrelated to the original. However, the point of defining D is to establish a mechanism for representing a possibly limited set of errors that are introduced by scanning. For example, one can represent an OCR scanner which only makes errors when it randomly substitutes a number "1" for the letter "l" and a number "0" for the letter "O".

The notion of distance between elements of R(S) requires definition of a metric. If two signals, $R_0$ and $R_1$ are only a small distance apart, as defined by the metric, then a function must be found which is computed from one of the signals, say $R_0$, that will allow transformation of $R_1$'s induced alphabet sequence into $R_0$'s induced alphabet sequence. The metric is therefore $d:R(S) \times R(S) \rightarrow Z^+$. The metric function maps the cartesian product $R(S) \times R(S)$ to the non-negative integers. The selected metric function must satisfy the following conditions:

$d(R_i, R_j) = d(R_j, R_i)$, $d(R_i, R_j) + d(R_j, R_k) \geq d(R_i, R_k)$, $d(R_i, R_j) = 0$ if $R_i = R_j$, if $d(R_i, R_j) = 0$ then $R_j = R_i$.

The nature of errors introduced by the digital scan function determines the suitability of the selected metric. The metric, in turn, determines the type of function that is suitable for transforming one signal's induced alphabet into another's. Metrics proposed in the literature include: Hamming distance, edit distance, Lee distance, Bose distance, BCH distance, Arithmetic distance, Free distance, Mahalanobis distance, distortion measure and Linear Predictive Coding distance such as Itakura-Saito distance.

For the sake of example, the Hamming distance metric will be detailed. The Hamming distance between two signals can be defined as the number of index positions at which the signals differ. Hamming distance is a suitable metric when the digital scan function only introduces substitution errors between the induced sequences. A substitution error occurs when indexed alphabet element $\alpha_i$ in a signal is replaced by another alphabet element $\beta_i$ where $\beta_i \neq \alpha_i$. If the digital scan function introduces insertion and deletion errors, as well as substitution errors, then the Hamming distance metric is not particularly well suited for the application. An insertion error to the digitized signal corresponds to the insertion of ($B_{new}$, $\alpha_{new}$) between indexed elements i and i+1. A deletion error to a signal corresponds to the elimination of ($B_i$, $\alpha_i$). For some signals, a second signal can be produced through a single insertion or deletion error such that the Hamming distance between two signals is proportional to the length of the signal. Such behavior makes Hamming distance less desirable in the face of insertion and deletion errors.

Another metric alternative is the edit distance metric. One definition of the edit distance between two signals is the minimum number of insertions, deletions and substitutions required to transform one signal's induced sequence into another's. The standard string edit distance function:

$$d(R_0,R_1) = \text{editdistance} (\alpha_1\alpha_2 \ldots \alpha_N, \beta_1\beta_2 \ldots \beta_{N+m1})$$

is an example of a suitable metric for a digital scan function which introduces addition and deletion errors.

The marker, computed in a preprocessing computation at generating time and used in the digital information recovery process can assist in the detection, location, and correction or N errors introduced by the digital scanning process. The N error correction process is implemented by encoding the digital information prior to generation, supplying additional redundant information in the marker, and decoding the digital information at data recovery time. The marker, or certificate, function is defined as:

$$F(R_0) = F(\{(B_1, \alpha_1), (B_2, \alpha_2) \ldots (B_n)\}) = k_0.$$

The value $k_0$ is called "the marker" or "the certificate" of $R_0$. Let $k_j$ be the marker computed from signal $R_j$, $k_j = F(R_j)$ All of the information that is expected to be recovered and which cannot be recognized completely accurately by the scanning process must be encoded in the marker. There is a tradeoff between the size of the set of objects recognized by the scanning process and the size of the set of objects encoded in the marker. Better object recognition by the scanner implies more capable, complex and expensive scanning technology. Better object recovery by the decoding process implies longer markers and more expensive decoding computation. As previously noted, it may be desirable to include semantic information, beyond the expected scanning errors, in the marker. Obviously, the marker length and decoding limitations for the technology will dictate the practical limitations thereof.

The inventive formulation as presented and claimed herein is independent of the type of objects generated and recovered. Of course, the objects can be ASCII text as is primarily encountered in the OCR context. However, the objects could as well be functional information conveyed through the digital representation. For example, in spreadsheets (as will be detailed with reference to FIGS. 3A and 3B), a table typically contains labeled rows and columns that identify elements in the table. The tabular presentation of digital information is an encoding of functional information in digital data. The encompassing nature of the previous definitions, in particular the definition of the alphabet and the certification function, allows the present model to generate and recover functional information for primary data recovery as well as other digital data about generation of the signal or the medium, for example.

If the certification function is independent of positional placement and layout information then:

$$F(R_0) = f(\epsilon(\alpha_1), \epsilon(\alpha_2), \ldots, \epsilon(\alpha_n)) = k_0.$$

This class of certification function includes classical error correcting codes such as: Linear Block, BCH, Burst-Error correction and Convolutional codes. Another set of simple certification functions are data compression algorithms including: for text-LZW and Arithmetic compression, for images-JPEG and MPEG, and for speech-ADPCM and LPC. Other certification functions may assist in the recovery of placement and layout information contained in the signal. Such location dependent certification functions, including spatial decomposition scan order, may be desirable for recovering functional information from labeled graphs or diagrams as well as moving images. Further, location and time dependent (e.g., vector) certification functions may assist in the recovery of moving images (e.g., encoding the trajectory of an object in a movie).

The certification system adds computational steps and costs to the traditional generate-scan-recover digital information coding/decoding process. At the time of generation of the signal plus marker, the data is preprocessed (either on-line or off-line) to be provided with appropriate encoding and certificate functions. The preprocessing computation may include statistical analysis of the data to be generated as well as encoding and compression. The output of the preprocessing computation is the value $k_0 = F(R_0)$ where $R_0$ is the initial signal. The scanning step, interpreting $R_0$ through some process to obtain $R_1$, proceeds unchanged from the traditional procedure. If the scanning process is error free, then $R_0 = R_1$ and all the original information has been recovered. Both the traditional and the certification processes would terminate at this point. Unlike the traditional generate-scan-recover process, the certification process continues if $R_0 \neq R_1$. Location and correction of errors identified by the redundant information carried in the certificate is then attempted. The certification problem assumes a reference space S and an alphabet $\Sigma$ and the following:

1. Certificate $k_0 = F(R_0)$ (computed during preprocessing).
2. Signal $R_1 = D(R_0)$ such that the metric $d(R_0, R_1) \leq t_i$, $t_1$, $\epsilon Z$,
3. Certificate function F( ), and
4. Certificate $k_1$, such that $k_1 = F(R_1)$ (computed at data recovery) then find the sequence $\alpha'_1 \alpha'_2 \ldots \alpha'_n \epsilon \Sigma^*$ where $F(R_x) = k_0$ and $d(R_x, R_1) \leq t_2$, $t_2 \epsilon \Sigma$.

The input parameters in the problem formulation are the reference space, a signal plus marker and a certification function. The signal plus marker can be thought of as containing both the original digital data and the certificate or marker calculated in the preprocessing step. Identification of the certification function may be accomplished tacitly or by including an identifier in the marker. The marker corresponding to the original digital data provided as input can be calculated once the certification function has been identified.

The metric inequality simply translates into the assumption that the input recovered or recognized signal $R_1$ is "close" to the target original signal $R_0$. The two signals are required to be close with respect to the sequence of subsets $\{B_i\}$ and $\{C_i\}$ and the sequence of alphabet elements $\{\alpha_i\}$ and $\{\beta_i\}$.

The output expected for the solution to the problem is a sequence whose elements are selected from $\Sigma$, without explicitly recovering the signal $R_O$ in this formulation of the problem. For a suitably chosen certification function, the $\alpha'_1 \alpha'_2 \ldots \alpha'_N$ sequence will exist uniquely and be identical to $\alpha_1, \alpha_2 \ldots \alpha_N$.

The existence and uniqueness of the solution depends on the family of signals and the selection of special certification functions. For many applications, selecting a certificate function that simply compresses the induced string of alphabet elements or objects is sufficient. Such a marker can be readily computed from the ASCII version of the text. In such an example, the recovery of the string of ASCII text is done as opposed to recovering any embedded functional information. The certificate function F is the LZW compression algorithm, so the certificate $k_O$ is the compressed version of the ASCII text. The number of bits required to represent $k_O$ will be, on average, a third of the bits required to represent the original ASCII text. When the digital scan function produces $R_1$, the data can simply be discarded assuming that it is entirely erroneous. The marker will then be decompressed to obtain the original ASCII sequence and the data recovery process is complete. Such a marker function has the advantage of working under a wide variety of conditions and of correcting up to errors in a sequence of alphabet elements. Clearly, however, the marker values are quite large in such an instance and may not be at all practical.

As previously noted, the implementation of the invention requires the existence and use of a reliable side channel. Clearly, the inability to accurately recognize and reproduce the main channel information will similarly inhibit the recovery of the side channel information unless a more reliable symbology is utilized for conveying the side channel information. There exist "bar code" symbologies which are adequately expressive, and highly reliable for each of the relevant media detailed in the table of FIG. 1. The following table illustrates the information density attainable in "bar code" encoding for each of the relevant media:

| Bar code type | Information Density |
| --- | --- |
| Audible | 2400 b/s |
| Printed | 0.5 b/pixel |
| Dynamic | 16 b/(pixel*s) |
| Multimedia | 2400 b/s - 16 b/(pixel*s) |

Audible bar codes are sequences of sound emitted over time that contain encoded marker values corresponding to target sounds generated during predetermined time periods. One can perceive, yet not be distracted by, the hum of a computer or the hiss of an air-flow system while listening to music. Similarly, the introduction of a marker as an audible signal accompanying the main channel audio information in an audio signal plus marker can be conducted without evident interference with the main channel information. In this manner, an audible marker can be provided to a computer audio recognition system which receives, digitizes and reproduces the analog information and which will simultaneously receive, decode and use the digital marker information. The kind of information about the signal which can effectively assist an audio recognition system includes the general identity of the sound-generating means (e.g., voice, keyboard, etc.), the specific identity of same (e.g., the identity of the speaker or singer), tempo and volume detail, and conceivably the notes, lyrics, phonemes, pitch, etc. of sung, instrumentally performed music or spoken audio. In isolated word synthesized speech recognition, sequences of sounds encoding the marker could be emitted at the conclusion of each word. In continuous synthesized speech recognition, the audible bar code could be issued simultaneously with the speech, where the relevant marker values for a given sentence would, for example, be transmitted only during the period of time during which the words of the sentence are audible. Audible bar codes are useful for information recovery from synthesized and preprocessed speech, other audio signals, movies, and natural language translations. The information density figure contained in the referenced table for audio bar codes is derived from the v.22 1200 bit/sec duplex modem standard using differential phase shift modulation.

Figure 2:
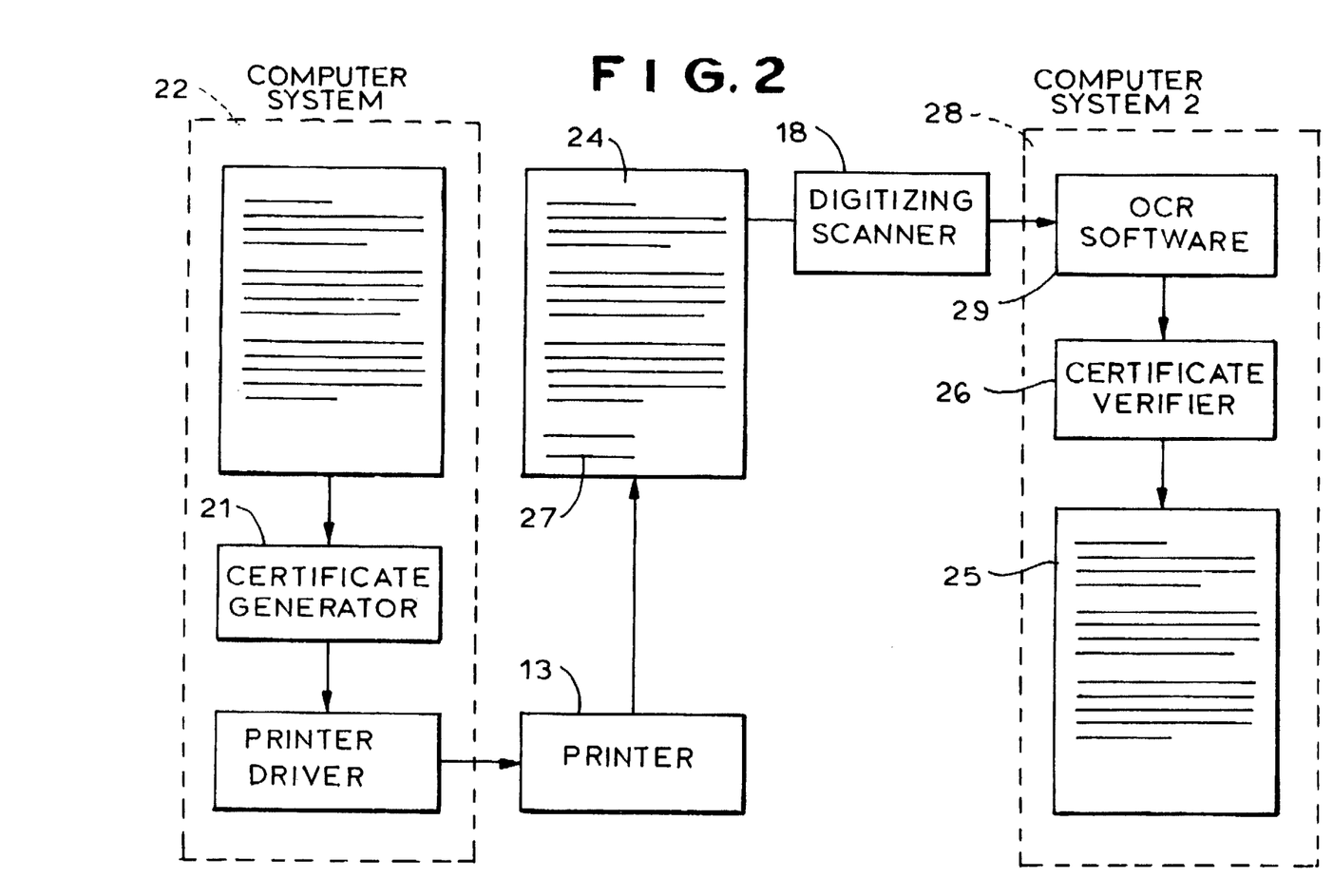
FIG. 2 illustrates an Optical Character Recognition (OCR) system adaptable for use with the present invention.

Printed bar codes are sets of printed symbols encoding a marker that corresponds to data in the signal, as fully detailed in the aforementioned co-pending patent applications. The information density figure quote for printed bar codes is representative of real density achieved in the art. Printed bar codes are suitable for marking papers, books, handwriting and photographs. The application to papers is detailed in co-pending patent applications, though improved upon herein. As detailed in the previously referenced co-pending application, the print application of the marker concept finds utility in Optical Character Recognition (OCR) systems, utilizing the generate-scan-recover methodology, such as is illustrated in FIG. 2. FIG. 2 illustrates document 24 which comprises both an analog portion for human perception and understanding and an encoded document marker portion 27, perceivable by the human user but generated primarily for use by a recognizing computer. Computer System 1, at box 22, generates the document marker, in Certificate Generator 21, based upon the analog information to be included in and on the printed signal plus marker. The document marker 27 is printed along with the printing of the analog portion of the document by printer 13. A further extension to the document marker concept is the inclusion of additional semantic information about the generation of the printed signal, rather than just about the layout and content thereof. Examples of additional semantic information which will preferably be included in the expanded "marker" include the spatial decomposition scan order, identification of the particular computer software used in the generation of the printed analog information, identification of either the human or computer source of the information, detail as to the dissemination of the information, identification of the objects on the page, and, of course, appropriate error correction information. As an example, the marker accompanying a printed spreadsheet can be encoded to identify the sources of the statistics, the program or other mathematical application to which the statistics were subjected, or the program or mathematical application from which the statistics were derived.

In the image processing arena, the information about the signal can be included in a visible, non-intrusive marker either incorporated into the human-perceivable image or provided in addition to same (e.g., in an otherwise unused margin of the image surface). The detailed marker information which may be included to facilitate the recognition, reproduction and use of an image includes scan order, spatial location measurements, shape or object identification, color detail, etc. With this marker, a recognition system will be better equipped to distinguish among adjacent images, etc.

Although included in the discussion of "printed" bar codes, it is clear that the notion of printing the marker is largely media-dependent and may, obviously, not actually be applied to the media by "printing", per se. The need for communicating the spatial decomposition scan order as applied to image recognition can be exemplified by analyzing a photograph of, for example, a bat and a ball. If a section of the bat is partially or totally obscured by the image of the ball, then an "lunaware" scanning computer will not be able to distinguish, identify and reproduce the image successfully. Communicating to the scanning computer that the photograph includes a bat and a ball will not adequately convey the relative positions thereof. If, however, the marker communicates the method for decomposing the space, whereby the bat is recognized along the spatial coordinates on either side of the ball image, the scanning computer will have no difficulty in recognizing and reproducing the image.

In the field of handwriting recognition, recognizing systems require extensive "pre-programming" in order to accurately identify handwritten characters. The pre-programming information may include tables of representative handwriting samples correlated to actual analog or digital representations of known characters, including both spatial and temporal data gathered when generating the initial signal. This bank of pre-recognized characters and temporal data facilitates the interpretation of a given handwritten input; however, accurate interpretation assumes that the recognizing or input-receiving computer has resident therein the available table of pre-recognized characters for the person providing the handwritten input. Clearly, handwriting recognition systems will remain quite limited in usage if each system must be pre-loaded with sample translation tables from all possible users. A marker, in accordance with the present invention, accompanying handwritten input can eliminate the uncertainty of "raw" translation when a pre-loaded table is otherwise unavailable. The translation table can be communicated to any recognizing computer via the computer-generated marker which accompanies the handwritten input. For the handwriting recognition implementation, however, preprocessing of a handwritten piece, after the initial generation thereof, will not be as effective as processing the handwritten input (i.e. applying the certification function) during the initial input.

Dynamic bar codes are sequences of images displayed over time, each containing marker values corresponding to data displayed during some predetermined time period. Such bar codes are suitable for marking movies, objects in remote vision applications, television, and visualization applications. The information density quoted in the table above is calculated assuming 32 frames per second of printed bar codes. Visible yet unobtrusive time-varying sequences of, for example, black and white dots allocated to specific pixels on a television or movie screen would not interfere with human reception of the main channel information, yet may assist a recognizing system's reception of same. It will be evident from the foregoing description that the information contained in the marker need not apply to the contemporaneously-perceptible main channel information. For example, the marker may instruct a recognizing system to prepare for receipt and processing of particular information which will subsequently be communicated.

Multimedia bar codes are encoded marker values for multiple media. For example, marker information could flow through audible and dynamic bar code channels simultaneously to assist information recovery for a dubbed movie. Such bar codes are suitable for marking multimedia presentations and the density thereof is computed as the sum of that available from one audible and one dynamic bar code. It is also possible to provide encoded markers in one media to effect conversion between different media, for example from spoken language to written or vice versa, or from one written or spoken language to another. Detailed examples might include an English-language business letter containing a special marker scannable for conversion into a business letter in Japanese; a preprocessed audio tape version of a Japanese speech monitored by a computer through a digital microphone and converted into an equivalent English speech; and, automated scoring of preprocessed music and sound recognition, particularly for home use by hearing-impaired individuals.

Figure 4:
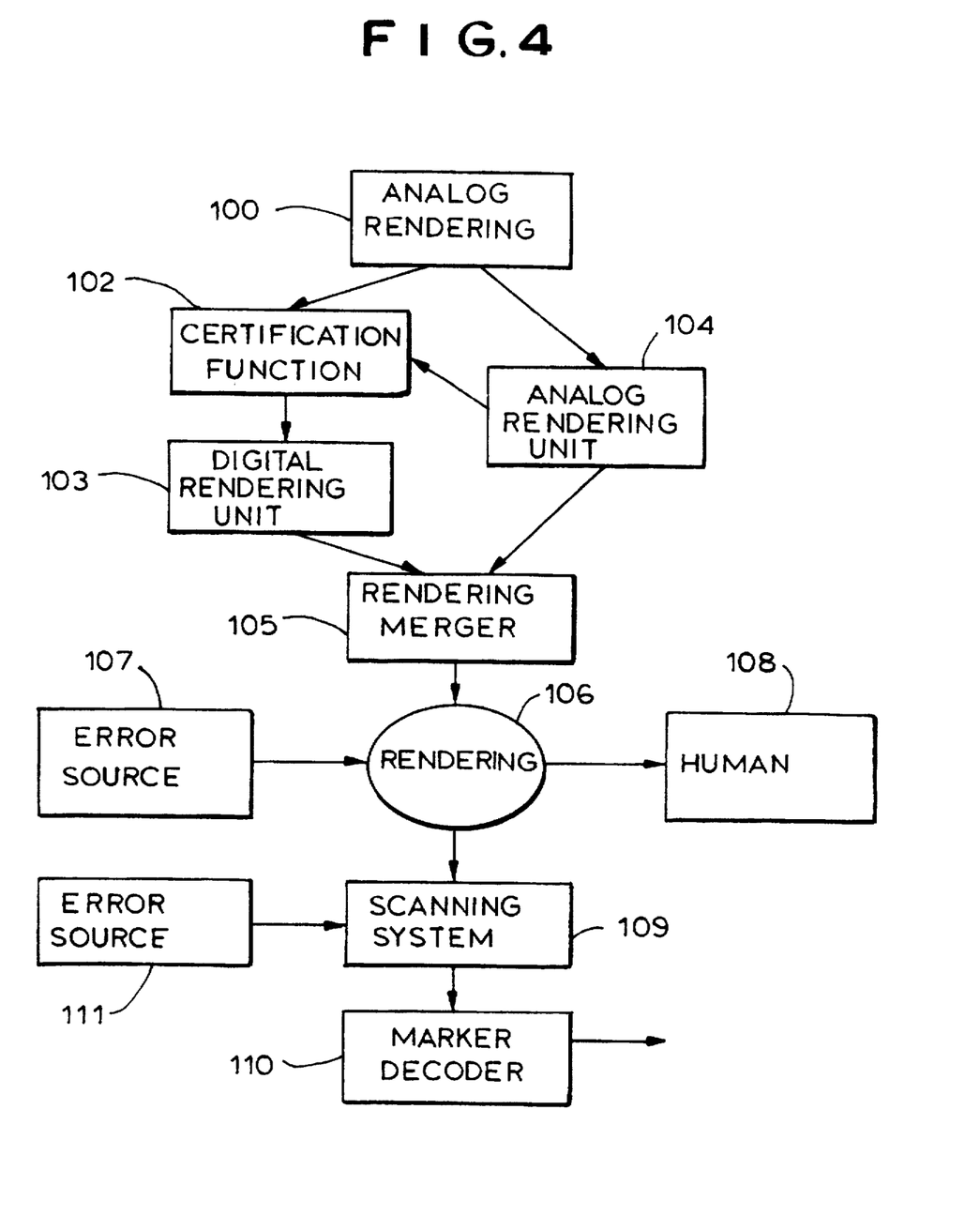
FIG. 4 provides a process flow in accordance with the present invention.

In implementing the invention, one begins with the three distinct steps of a typical data recognition method including generating a first version of the main content information, scanning the signal, and recovering or reproducing a second version of the main content information. The generating step comprises converting the original digital data into a physical representation or analog "signal plus marker." The analog representation is converted into a digital signal during the scanning step performed by the second, or the scanning, computer. Finally, the digital signal is converted into the original digital data format, as reproduced digital data, in the recovery step. The present invention augments all three of the processing steps, as can be detailed with reference to the process flow shown in FIG. 4. For the present invention, the assumption is that the original signal has been processed by a first computer, whether originally generated or subsequently processed by that computer. From the generation of the main content information, at 100, additional information related to the process of generation, the expected scanning and recovery errors, the content of the signal, etc. is extracted in the certification function 102 wherein it is preprocessed, encoded and converted from digital data to analog side channel information (the certification function), at 103, and provided with the main channel information in the same medium therewith, via the Rendering Merger step at 105. Necessarily, the main channel generation detail, from the first generating step 104, must additionally be provided to the Certification Function in order for the process to determine where the available side channel is on the medium. The Rendering Merger step, 105 then generates the combined signal plus marker, 106. It is shown herein that errors may be introduced in the generation or transmission of the signal plus marker, apart from such errors as may be further introduced during the scanning of the signal plus marker. In the Scanning step, 109, the side channel information is additionally scanned (i.e., received), converted into a digital signal and decoded at 110. The decoded side channel information is used in the recovery step for correcting, augmenting or otherwise enhancing the recovery of the main channel information.

Figure 3A:
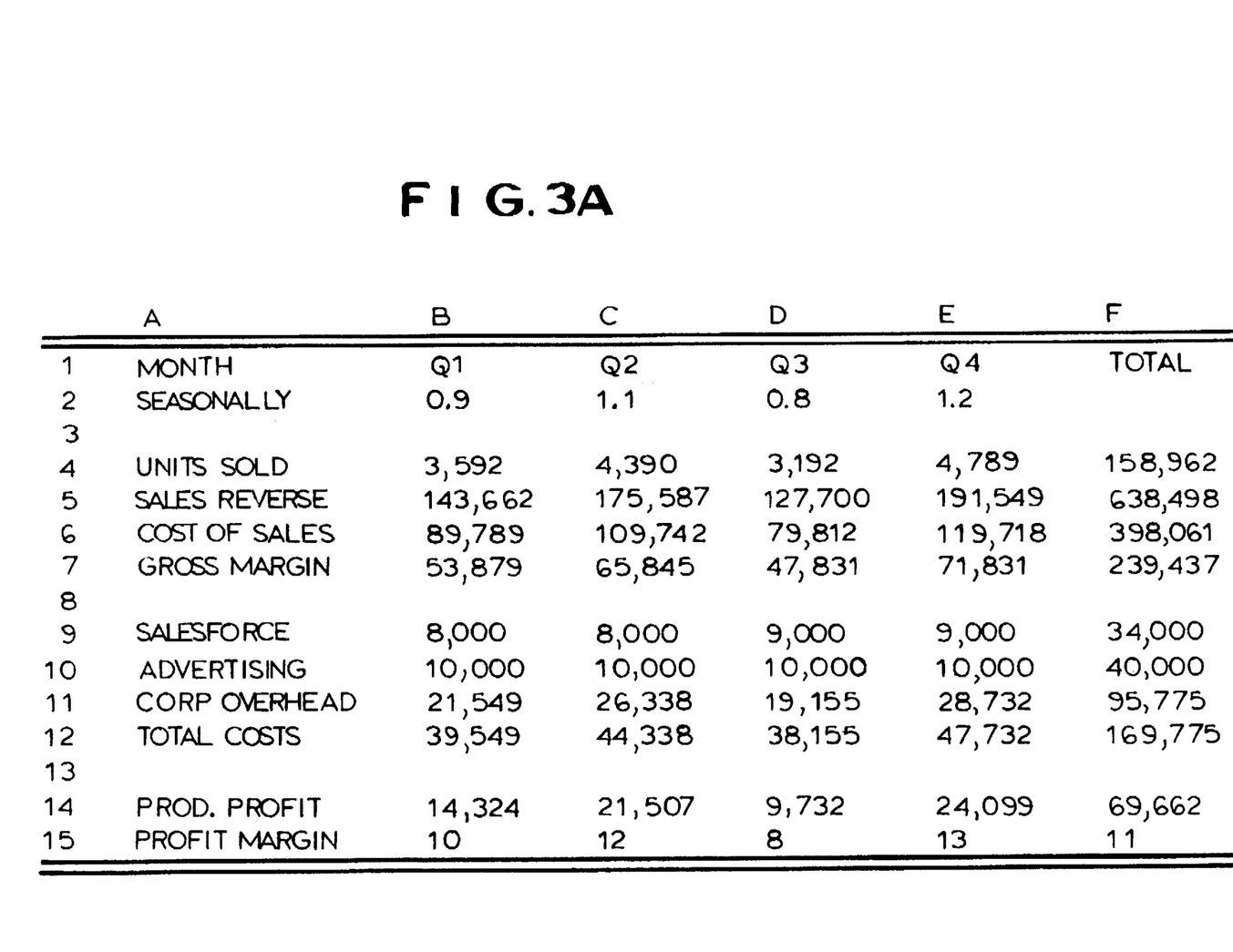
FIGS. 3A and 3B illustrate the apparent and the semantic content, respectively, of a spreadsheet.
Figure 3B:
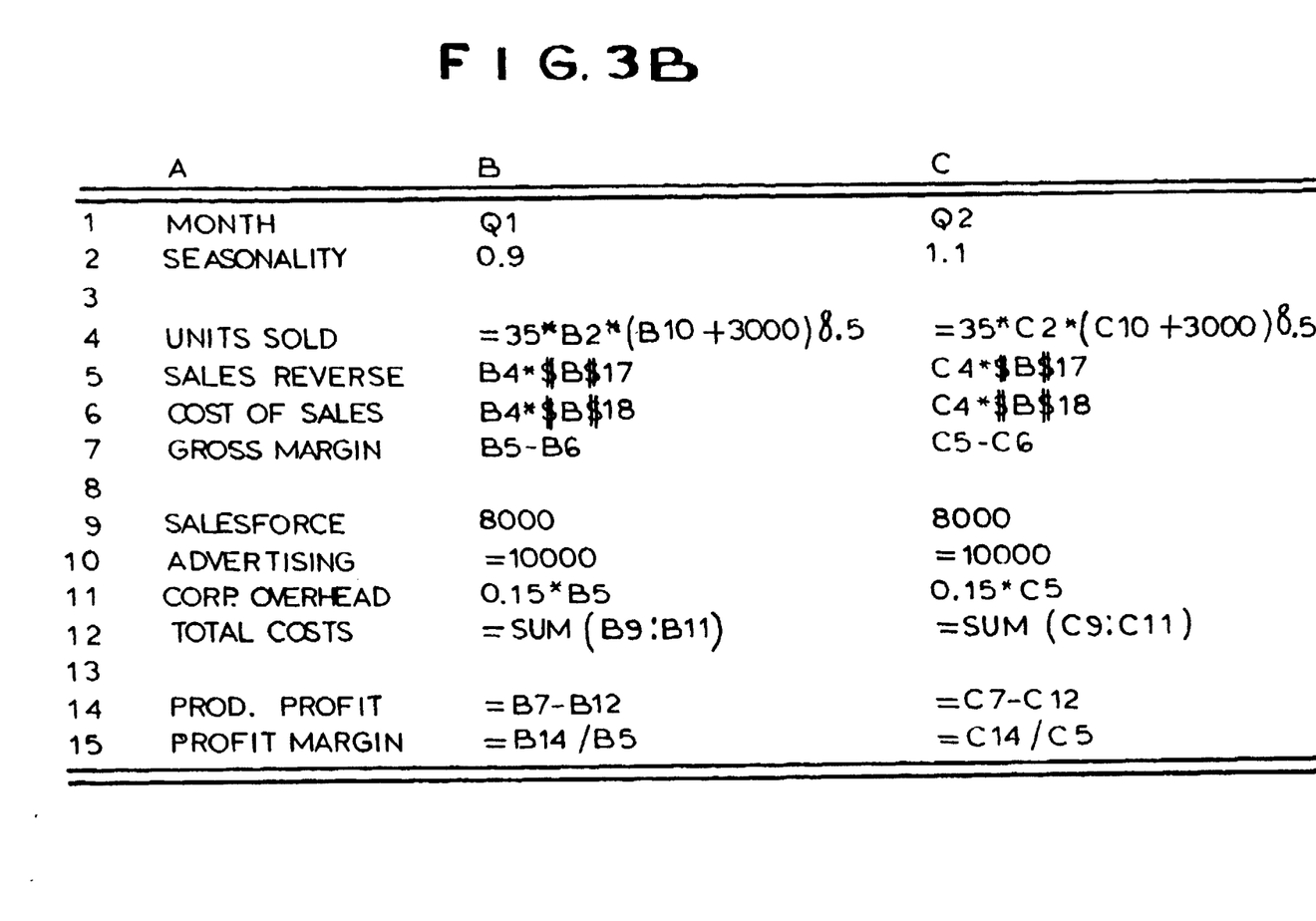
Figure 3B:
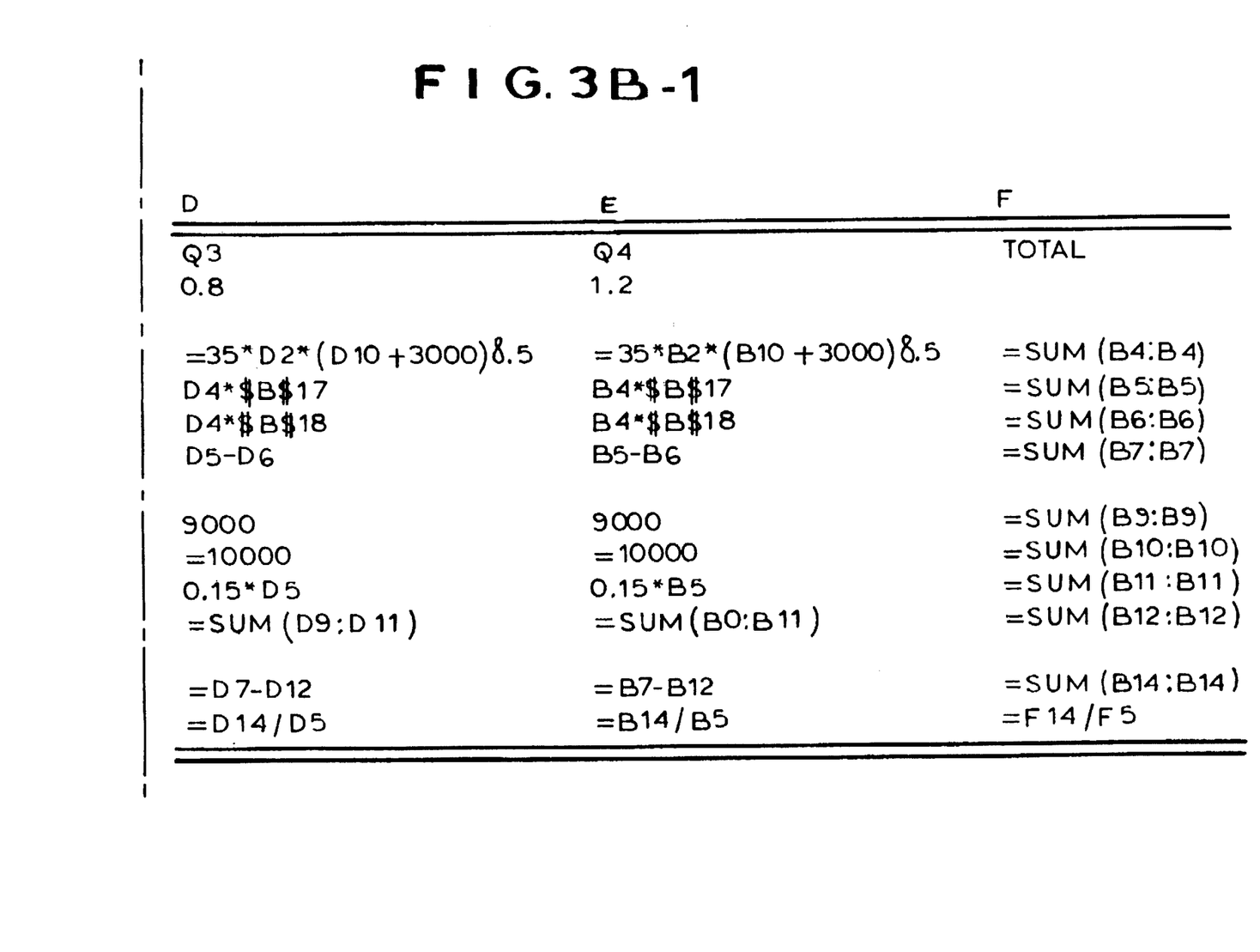

As a detailed example, FIGS. 3A and 3B provide illustration of a portion of an analog spreadsheet of a sample quarterly financial report and the semantic content associated therewith. Each object which is apparent on the face of the analog version of the spreadsheet, 3A, has not only its apparent meaning (e.g., that the units sold for the first quarter amounted to 3,592) but also its semantic meaning as illustrated in like position in 3B (e.g., that the figure for units sold in the first quarter was derived by the function "35*B2* (B10+3000)8.5". Since, the spreadsheet existed as a digital representation of a spreadsheet in a first computer, that semantic meaning is available to the first computer upon generation. If the spreadsheet were to be saved to a disk, the apparent contents and the semantic instructions of the spreadsheet program would be encoded in the disk file. Therefore, for complete recovery of a signal's digital representation, ideally, both the apparent and the available semantic information would be conveyed and recovered.

Assuming ideal encoding in the certification function, the recovery of the marker for the spreadsheet would first extract scan order and an indication of what signs, symbols or objects the scanning process is expected to recognize. The set of recognizable objects identified by the certificate is its alphabet, with the objects themselves being the elements of the alphabet. Elements of the alphabet may be individual symbols or aggregate collections of symbols representing higher level objects. Therefore, for the OCR scanning of the spreadsheet, the alphabet might include the 12 pt. Roman Font alphabet used to represent the spreadsheet characters, a table, representing the displayed array of information, and a spreadsheet, representing the directed acyclic graph of expressions that produced the array.

Aggregate alphabet elements, such as tables and spreadsheets, carry the semantic content of signals. In general, it is much more difficult for scanning systems to recognize and recover the semantic information in a signal than to recognize and recover the component characters and digits used in the signal. With current scanning technology, it cannot be expected that the system will automatically recognize the entire contents of a signal. However, with enough information encoded in the certificate, it may be possible to recognize particular objects with significant semantic meaning.

The alphabet then consists of two types of objects. The first set of objects are those that can be scanned and recognized accurately with high probability. The second set of objects are those which can only be scanned and recognized with high probability with the assistance of "out-of-band" information. The "out-of-band" information for the spreadsheet, encoded in the marker, could identify the location and type of the object as well as the location and number of the object's components. Complete recovery of the alphabet information from the marker at the decoder implies successful recovery of a digital encoding for each alphabet element. The digital encoding may be the element's index within the alphabet or some other index.

The next marker processing step after alphabet recovery is content recovery. In the content recovery step, it is determined how many times an object occurs in a signal, where each object occurs in the signal and the canonical order for each object in the signal. Knowing the type, number, location, and scanning order of the objects occurring in a signal allows complete recovery of the digital data used to produce the base signal. However, if some of the object information is incorrect, the recovered digital data may not be totally accurate. The certificate's role in this portion of the process is to provide sufficient redundant information about the sequence of objects to allow system software to correct a limited set of errors. Depending upon the expected number and distribution of error occurrences, the certificate supplies side channel data according to well defined error correction codes.

Finally, after recognizing the images of the objects occurring in the base signal, the data extraction is completed by generating functions/programs corresponding to those found in the marker. The functions that are generated will depend on the application. For the spreadsheet, the program input illustrated in FIG. 3B for each corresponding entry on FIG. 3A could be the encoded functions. These functions may additionally be invoked for verifying the accuracy of the scanned characters, whereby the scanning computer will apply the communicated function to the appropriate data and compare the result to the scanned value.

It should be understood that the computer which generates the marker need not have originated the signal. As noted above, a signal can be preprocessed "off-line" by a computer and a marker generated for its contents for incorporation onto or into the signal plus marker. Therefore, as an example, a page of a printed book can be scanned and the input provided to a computer adapted to apply the certification function to generate markers. The computer will encode the relevant information and generate a marker for printing or other inclusion on the face of the original printed page, without generating a new version of the page. Similarly, a digital "marker track" can be added to an original audio signal. The preprocessing of a signal in this manner necessarily introduces its own error sources, depending on the scanner accuracy. In encoding the marker for the preprocessed signal, therefore, the generating computer will additionally include information in the marker as to the identity, and perhaps the relative accuracy, of the scanning and certification system which generated the marker. A subsequently used scanning system will use the scanner identity information in assessing its own fault tolerance when recognizing and reproducing the signal plus marker. Therefore, if a more reliable scanning system is used in the second scanning of the original signal plus marker, the second, more reliable, scanning system will "know" that its interpretation of the data may be more correct than that of the marker generating computer, which relied on a less reliable scan.

The extreme of the marker applications is to provide digital representations of all of the contents of the analog data in the marker. In such an extreme, the bandwidth necessary for inclusion of digital representations of all of the analog information (e.g., the entire contents of the spreadsheet program used in generating a page of spreadsheet data) would limit the bandwidth available for provision of the analog information, and may in fact obviate the need for provision of the main channel information. Clearly, in implementing the teachings of the present invention, one must assess the realistic bounds of its applications. The invention has been described with specific reference to several applications. One having skill in the art will recognize applications and modifications without departing from the spirit and scope of the appended claims.

What is claimed is:

1. A composite signal comprising:
   at least one first component comprising an analog representation of content data generated by a processor from a digital representation of said content data; and
   at least one second component comprising a marker derived by said processor from said digital representation and encoded for use by a computer receiving said composite signal in identifying and correcting errors which occur while processing said analog representation to recognize objects therein.

2. The signal of claim 1 wherein said marker comprises at least one error correcting code assigned for said analog representation.

3. The signal of claim 1 wherein said digital encoding comprises encoded information about the generation of said analog representation.

4. The signal of claim 1 wherein said first and second components comprise time-varying information.

5. The signal of claim 4 wherein said composite signal is provided for reception by said computer through an audio channel of a medium.

6. The signal of claim 5 wherein said second component is provided in machine-receivable format.

7. The signal of claim 4 wherein said first and second components comprise image information.

8. The signal of claim 7 wherein said image information is provided in machine-readable symbology.

9. The signal of claim 3 wherein said first and second components comprise printed information.

10. The signal of claim 9 wherein said printed information is provided in machine readable symbology.

11. A method for a first computer to provide a composite signal including an analog representation of content data, to permit said content data to be accurately recovered by a second computer, comprising the steps of:

encoding digital values derived from a digital representation of said content data in a machine-recognizable marker; and providing said marker in a medium with an analog representation of said content data for use by said second computer in identifying and correcting errors which occur while machine-recognizing objects in said analog representation.

12. The method of claim 11 wherein said marker further encodes digital values relating to the generation of said content data.

13. The method of claim 11 wherein said marker further encodes digital values dependent on one or more data values of said content data.

14. The method of claim 13 wherein said marker further encodes error correction codes derived from said digital representation of said content data.

15. The method of claim 11 wherein said digital values include spatial decomposition scan order information for use by said second computer in processing an image represented by said analog representation along spatial coordinates to recover objects in said image.

16. The method of claim 11 wherein said providing comprises generating said at least one first digital value in machine-receivable format.

17. The method of claim 11 wherein said content data includes audio content data and said marker is provided in an audio channel of said medium.

18. The method of claim 11 wherein said content data includes video content data and said marker is provided in a video channel of said medium.

19. The method of claim 11 wherein said content data includes image content data and said marker is provided in an image information channel of said medium.

20. The signal of claim 5 wherein said audio channel conducts said signal by sound.

21. The method of claim 17 wherein said audio channel conducts said signal by sound.

22. The method of claim 18 wherein said video channel conveys said signal by moving images displayed by light.

23. The method of claim 19 wherein said image information channel conveys said signal by an image displayed by light.

24. A method for processing analog information received together with a machine-recognizable marker to permit errors which occur while recognizing objects in said received analog information to be identified and corrected, comprising the steps of:

receiving said analog information and a machine-readable marker which encodes error correction code (ECC) values derived from a digital representation of said analog information;

decoding said machine readable marker to recover said ECC values;

processing said received analog information by machine to recognize objects therein; and utilizing said ECC values to identify and correct errors which occur while recognizing said objects.

25. The method of claim 24 further comprising the steps of receiving information relating to the generation of said analog information and applying said received generation information to said received analog information in generating second analog information.

26. The method of claim 24 wherein said analog information represents an image, and said marker further encodes spatial decomposition scan order information, said method comprising the further steps of:

decoding said marker to recover said spatial decomposition scan order information; and utilizing said spatial decomposition scan order information to process said image along spatial coordinates to recover objects in said image.

27. The method of claim 24 wherein said analog information includes printed information.

* * * * *